United States Patent [19]

Asaba et al.

[11] Patent Number: 5,063,295

[45] Date of Patent: Nov. 5, 1991

[54] SLIT DISPOSITION STRUCTURE OF FIXED SLIT DISK IN PULSE ENCODER

[75] Inventors: Eiki Asaba; Yoshihito Tanabe, both of Yamanashi; Kiyoshi Tagami, Hachioji, all of Japan

[73] Assignee: Fanuc Ltd., Yamanashi, Japan

[21] Appl. No.: 571,545

[22] PCT Filed: Dec. 26, 1989

[86] PCT No.: PCT/JP89/01303

§ 371 Date: Aug. 23, 1990

§ 102(e) Date: Aug. 23, 1990

[87] PCT Pub. No.: WO90/07693

PCT Pub. Date: Jul. 12, 1990

[30] Foreign Application Priority Data

Dec. 28, 1988 [JP] Japan ................................. 63-329117

[51] Int. Cl.$^5$ ............................................. G01D 5/34
[52] U.S. Cl. ........................... 250/231.14; 250/237 G
[58] Field of Search ...................... 250/231.14, 231.17, 250/231.18, 237 G; 341/13

[56] References Cited

U.S. PATENT DOCUMENTS 4,678,908 7/1987 LaPlante ........................ 250/231.14
4,700,062 10/1987 Ernst ............................... 250/231.14
4,906,838 3/1990 Sogabe et al. .................. 250/231.14

FOREIGN PATENT DOCUMENTS 63-63916 3/1988 Japan .
63-117214 5/1988 Japan .

Primary Examiner—David C. Nelms
Assistant Examiner—K. Shami
Attorney, Agent, or Firm—Armstrong, Nikaido, Marmelstein, Kubovcik & Murray

[57] ABSTRACT

When a shape of each increment type slit group is a rectangle in a pulse encoder having a plurality of absolute type slits (24, 26, 28, 30) and a plurality of increment type slit groups (14, 16, 18, 20), the plurality of increment type slit groups and the plurality of absolute type slits cannot be irradiated by a single light emitting diode (46). To solve this problem, each increment type slit group is formed in a fan shape and disposed radially around an optical axis (13) of the single light emitting diode (46), so that the absolute type slits (24, 26, 28, 30) can be disposed at the remaining portion of a region (12) irradiated by the single light emitting diode (46). Consequently, a low cost compact pulse encoder can be provided.

2 Claims, 3 Drawing Sheets

SLIT DISPOSITION STRUCTURE OF FIXED SLIT DISK IN PULSE ENCODER

TECHNICAL FIELD

The present invention relates to a slit disposition structure of a fixed slit disk in a pulse encoder for detecting the rotational position or rotational speed of a motor or a spindle of a machine tool or the like.

BACKGROUND ART

In the past, use has been made of pulse encoders combining the use of absolute type slits and increment type slits, as represented by the Gray code, to detect the rotational position or rotational speed of a servo motor for driving and controlling industrial robots, machine tools, etc.

In the past, however, to further raise the resolution of detection of the rotational position by the increment type slits in the fixed slit disk, the slits have been divided into a plurality of increment type slit groups, and these groups have been disposed around the optical axis of one light emitting diode so that the slit groups receive a substantially equal irradiation by the light emitting diode. Therefore, there has been no room for an irradiation of absolute type slits as well, and therefore, these absolute type slits had to be irradiated by using another light emitting diode.

DISCLOSURE OF THE INVENTION

Therefore, an object of the present invention is to provide a slit disposition structure of a fixed slit disk enabling an efficient irradiation of increment type slits and absolute type slits by using of a single light emitting diode.

In view of the above object, the present invention provides a slit disposition structure of a fixed slit disk in a pulse encoder having a light emitting diode, a rotary slit disk, a fixed slit disk, and a light receiving device, having absolute type slits and a plurality of increment type slit groups, and detecting the angular position or rotational speed of a rotary body, characterized in that the plurality of increment type slit groups are disposed radially on said fixed slit disk around the optical axis of the one light emitting diode, and in that the absolute type slits are disposed around the optical axis and inside an arc formed by the extension of the outer circumference of said plurality of increment type slit groups.

In a fixed slit disk, by disposing the increment type slit groups at radial positions about the optical axis of a single light emitting diode and disposing the absolute type slits at the remaining regions about the optical axis and in an arc formed by an extension of the outer circumference of the slit groups, it becomes possible to evenly irradiate the slits without the use of a plurality of light emitting diodes and thus it becomes possible to provide a more compact pulse encoder.

BEST MODE OF CARRYING OUT THE INVENTION

Figure 3:
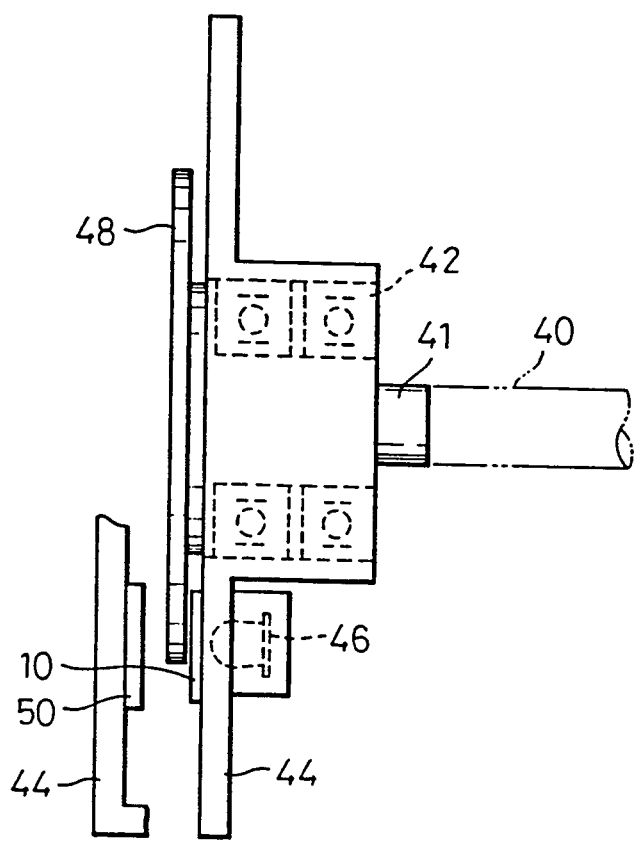
FIG. 3 is a side view of a pulse encoder.

The present invention is now described in more detail in accordance with the embodiments shown in the attached drawings. Referring to FIG. 3, bearings 42 are housed in a detector housing 44, and a rotary shaft 41 for a detector connected to an output shaft 40 of a motor is held thereby. A rotary slit disk 48 is fixed on the rear end of the rotary shaft 41, to be rotated with the output shaft 40. A light emitting diode 46 is attached at an appropriate position of the detector housing 44, and a fixed slit disk 10 is attached in the front thereof. Furthermore, a light receiving device 50 of a phototransistor is fixed on the detector housing, opposite to the light emitting diode 46, and interposing the rotary slit disk 48.

Figure 2:
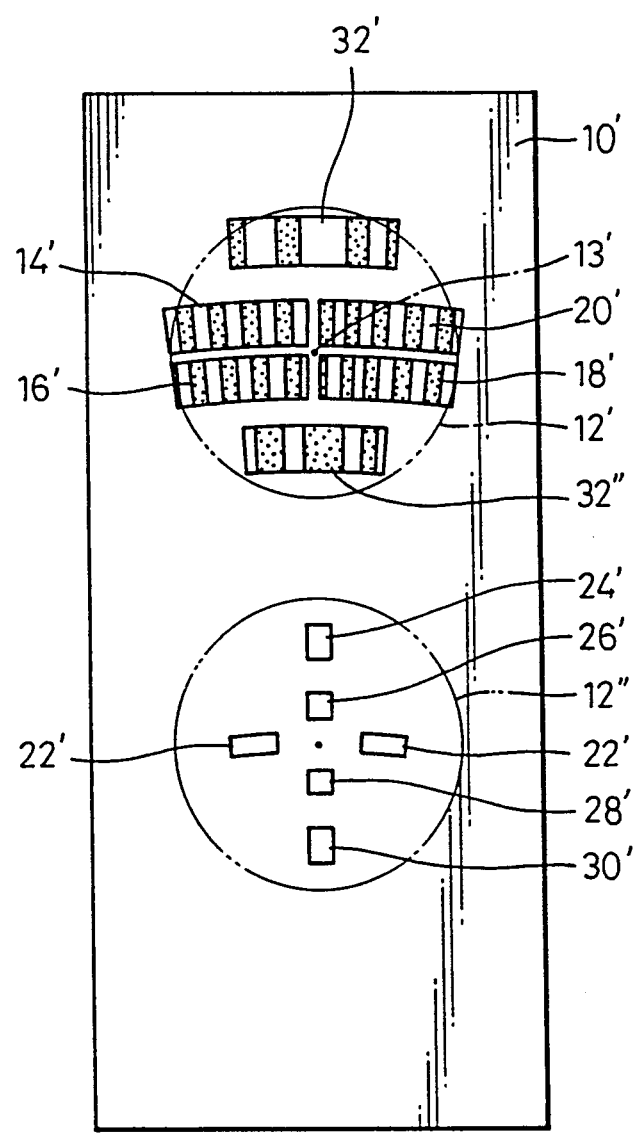
FIG. 2 is a frontal view of the slit disposition structure of a conventional fixed slit disk.

Below, a slit disposition structure of the fixed slit disk 10 of the above-mentioned elements of the pulse encoder is described. First, FIG. 2 shows the slit structure of a conventional fixed slit disk 10', wherein the two chain-dot lines 12' and 12" show the outer limits of irradiation regions of two LED light emitting diodes. Four substantially quadrilateral slit groups 14', 16', 18', and 20' are disposed at the top, bottom, left, and right of a center point 13' of the irradiation region by one LED. These are fixed disk increment type slit groups corresponding to the increment type slits provided in a rotary slit disk 4 (FIG. 3) and issue the A phase, B phase, $\overline{A}$ phase, and $\overline{B}$ phase optical signals. This is used for an interpolation for quadrupling the resolution of the intervals of the increment type slits provided on the rotary slit disk. That is, the slits are made so that the A phase and $\overline{A}$ phase, and the B phase and $\overline{B}$ phase are shifted by exactly $\pi$, and the A phase and B phase by exactly $\pi/2$. Therefore, when there are 2000 increment type slits on the rotary slit disk, it is possible to control the change in position of the rotary body by the same resolution as with a provision of four times that amount, i.e., 8000 slits. Further, these four slit groups 14', 16', 18', and 20' are disposed substantially symmetrically to the top, bottom, right, and left of the optical axis 13' to allow an even irradiation of light to each. When light is not irradiated evenly to the slit groups, it becomes difficult to achieve the above-mentioned four-fold resolution.

The two slit groups 32' and 32", known as the Z phase and the $\overline{Z}$ phase, are provided at positions above and below the optical axis 13' in the region of irradiation of the same LED light emitting diode. These slit groups issue a light signal with each revolution of a rotary body, that is, the rotary slit disk, and the number of revolutions can be counted. In this case, two phases are not necessarily required. The above signal also can be generated by a single phase.

Inside the outer limit 12" of the irradiation region of the other LED light emitting diode are disposed four slits 24', 26', 28', and 30' in the top and bottom directions. Further, two slits 22' are disposed to the left and right. These slits 24', 26', 28', 30', 22' are fixed disk side absolute type slit groups corresponding to the absolute type slits comprised of the Gray code, for example, provided in the rotary slit disk, and are normally referred to as the C1 phase slit, C2 phase slit, C4 phase slit, C8 phase slit, and reference slit. As is well known, it is possible to detect the rotary position of the rotary body by the above absolute type slit groups, but the rotary position which can be detected by an absolute type slit group is normally several degrees. To detect the rotary position at a high precision, an interpolation is performed by the signals generated by the fore-mentioned increment type slit groups.

Figure 1:
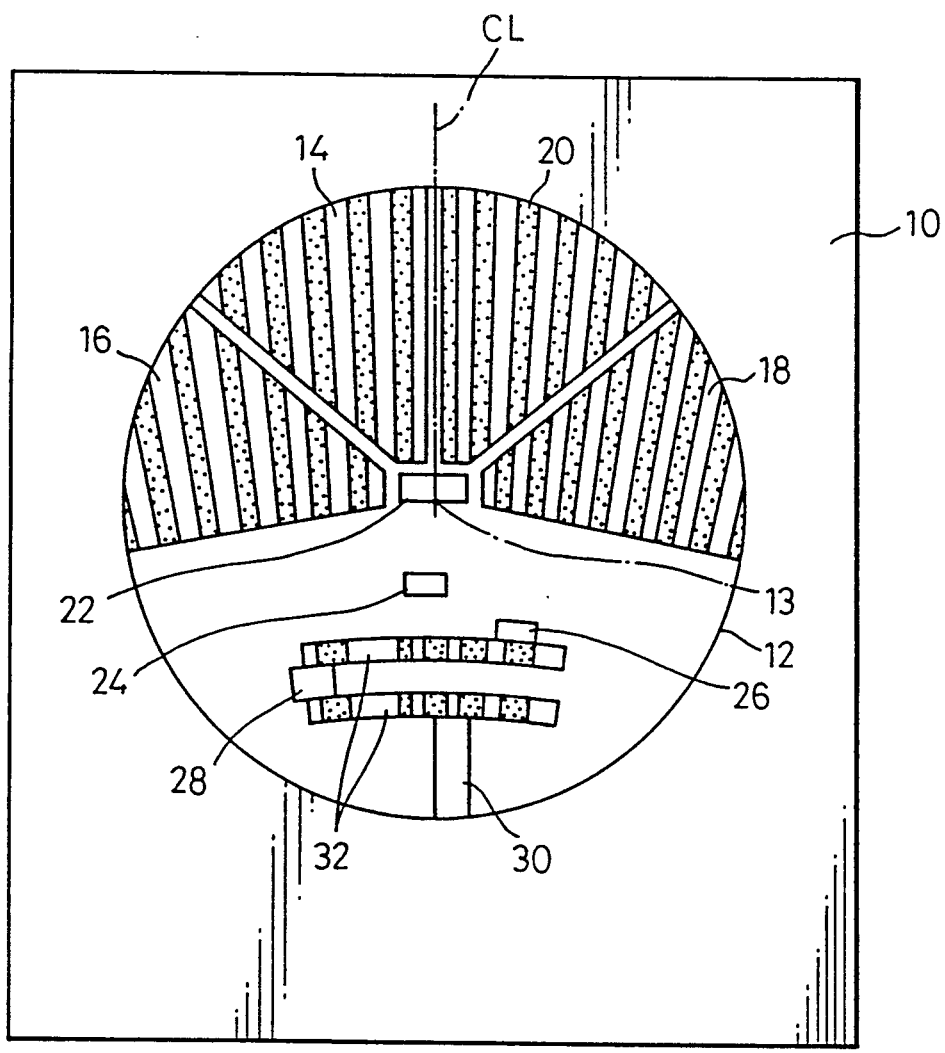
FIG. 1 is an enlarged front view of a slit disposition structure of a fixed slit disk according to the present invention.

In the above manner, in the past, in particular the increment type slit groups 14′, 16′, 18′, and 20′ were disposed at the top, bottom, right, and left of the optical axis 13′ to receive irradiated light equally, and therefore, the other slit group, that is, the absolute type slit group, could not be disposed in the irradiation range of a single LED light emitting diode. In the present invention, the increment type slit groups are formed in fan shapes and disposed radially as shown in FIG. 1. The reference numerals of FIG. 1, when corresponded to those in FIG. 2, are the same reference numerals but without the dash marks. The four fan shaped increment type slit groups A phase 14, B phase 16, $\overline{A}$ phase 18, and $\overline{B}$ phase 20 are disposed on the top side of the irradiation region shown by 12 about the optical axis 13 and the other slit groups are disposed at the remaining lower region. The A phase slit group 14 and the $\overline{B}$ phase slit group 20 are disposed symmetrically about a center line CL connecting the optical axis 13 and a center line of the rotary shaft 41, and the $\overline{A}$ phase slit group 18 and the B phase slit group 16 are also disposed symmetrically. The amount of light irradiated on the A phase slit group 14 and the $\overline{A}$ phase slit group 18 is equal to the amount of light irradiated on the B phase slit group 16 and the $\overline{B}$ phase slit group 20 so that the resolution of the pulse encoder is increased. The method of disposition of the absolute type slits 24, 26, 28, and 30 is not limited to the arrangement of FIG. 1, but the area of the slits is made larger as they are placed further away from the optical axis 13, so that the amount of light irradiated on the slits becomes about the same. The reference slit 22 is provided close to the optical axis 13, while the Z phase slit group 32 for counting the number of rotations of the rotary body is divided into two among the absolute type slits.

As mentioned above, in the present invention, the increment type slit groups are formed in fan shapes and provided radially, so it becomes possible to dispose other slits, that is, the absolute type slits at the remaining portion of the region irradiated by a single light emitting diode.

As clear from the above explanation, according to the present invention, a single light emitting diode is sufficient, and therefore, the fixed slit disk itself can be made smaller and, in turn, the pulse encoder can be formed compactly, and further, costs can be reduced. Further, during use, the power consumption caused by the use of light emitting diodes is halved.

We claim:

1. A slit disposition structure of a fixed slit disk in a pulse encoder having a light emitting diode, a rotary slit disk, a fixed slit disk, and a light receiving device, having absolute type slits and a plurality of increment type slit groups, and detecting the angular position or rotational speed of a rotary body, characterized in that the plurality of increment type slit groups are disposed radially on said fixed slit disk around the optical axis of one said light emitting diode and in that absolute type slits are disposed around said optical axis and inside an arc formed by the extension of the outer circumference of said plurality of increment type slit groups.

2. A slit disposition structure of a fixed slit disk in a pulse encoder according to claim 1, wherein each group shape of said plurality of increment type slit groups is a fan.

* * * * *